3,409,467
SILICON CARBIDE DEVICE
Francis R. Foley, Brookline, Mass., assignor to National Research Corporation, Newton Highland, Mass., a corporation of Massachusetts
No Drawing. Filed Mar. 11, 1966, Ser. No. 533,402
2 Claims. (Cl. 117—217)

The persent invention relates to silicon carbide devices and more particularly to single crystal silicon carbide devices such as diodes, transistors and the like.

A principal object of the present invention is to provide an improved method for producing low-resistance contacts to silicon carbide junction diodes.

Another object of the invention is to provide an improved device embodying silicon carbide having low resistance contacts applied thereto.

In the production of silicon carbide devices, particularly devices useful as light sources, it is highly desirable that the electrical resistivity of the device be kept to a minimum consistent with light emission so as to minimize the generation of heat.

In the present invention low resistance contacts are made to silicon carbide crystals and more particularly to silicon carbide crystals which are formed into junction diodes. Since silicon carbide crystals may inherently have high resistivity, particularly when formed of relatively pure silicon carbide having relatively low doping levels, it is extremely important that low resistance contacts be made to such crystals.

In the present invention low resistance contacts are made by depositing an active layer of titanium hydride on the surface of a crystal to be contacted and covering this titanium hydride layer with a layer of a noble metal, such as gold, silver and the like. This part of the structure is then fired at a temperature on the order of 1000° C. in an inert atmosphere so that the titanium hydride is dissociated to form titanium at the surface which reacts with the silicon carbide surface to form a surface which is readily wet by the gold or silver. This provides a low resistance rugged body through which other mechanical and electrical contacts may be made to the silicon carbide crystal.

In order that the invention may be more fully understood, reference should be had to the following non-limiting example.

*Example*

15 grams of methyl cellulose are dissolved in 150 cc. of hot water, and thereafter an additional 350 cc. of cold water are added to form a 3% solution of methyl cellulose in water. Two grams of commercially pure titanium hydride powder were mixed with 1 cc. of the methyl cellulose solution to form a slurry of titanium hydride and methyl cellulose. This slurry is painted on one face of a silicon carbide crystal to give a film approximately .001″ thick. A piece of silver approximately 20 mg. was then placed on top of the titanium hydride-methyl cellulose covering. The area of the silicon carbide surface was approximately 0.1 sq. cm. The silicon carbide containing the titanium hydride and the silver were placed on a carbon block. The carbon block and the titanium hydride-treated crystal were then heated by radio frequency induction heating to a temperature of about 1000° C. while the carbon block and treated crystal were surrounded with a helium atmosphere. When the silver was observed to flow out over the surface of the silicon carbide crystal, the power was turned off; the silicon carbide crystal was allowed to cool; and the procedure was repeated for the other side of the crystal. After dicing the crystal, the electrical resistances of the contacts were then measured and found to be on the order of 3 to 5 ohms for a .01 cm.$^2$ area.

While one specific example of the invention has been described above, other embodiments thereof may be employed. For example, gold can be used in place of silver, and other solders may be employed where the device is to be used under conditions where a lower melting point is not objectionable and where the lowest possible resistivity is not absolutely essential. Other inert gases than helium may be employed or the process may be carried out in the absence of any gas, such as a vacuum. Accordingly, the expression "inert atmosphere" is intended to include vacuum or other inert gases.

The contact metal may, if desired, also include doping impurities, such as aluminum, arsenic, etc. While it is difficult to make any definite statement with respect to the exact function of the titanium hydride, it is believed that atomic hydrogen resulting from the decomposition of the titanium hydride serves to reduce the surface oxides on the silicon carbide, thus promoting the creation of a strong surface bond between the titanium, silicon carbide and the contact metal.

The present invention accordingly provides low resistance contacts having a strong mechanical and electrical bond and provides a superior product which can carry high currents while operating at relatively high temperatures with a minimum power loss across the contacts.

Since certain changes can be made in the above process and product without departing from the scope of the invention herein involved, it is intended that all matter contained in the above description shall be interpreted as illustrative and not in a limiting sense.

What is claimed is:

1. The process for forming low-resistance contact with a silicon carbide crystal which comprises coating a surface of said crystal to be contacted with powdered titanium hydride, placing a body of contact metal over said titanium hydride coating and then firing the sandwich thus formed in an inert atmosphere to a temperature on the order of 1000° C. to melt the contact metal and to wet the surface of the crystal.

2. The process of claim 1 wherein the contact metal is a noble metal selected from the class consisting of gold and silver.

References Cited

UNITED STATES PATENTS 3,047,439    7/1962    Van Daal et al. _____ 148—33

JOHN W. HUCKERT, *Primary Examiner.*

M. H. EDLOW, *Assistant Examiner.*